Patented Oct. 4, 1949

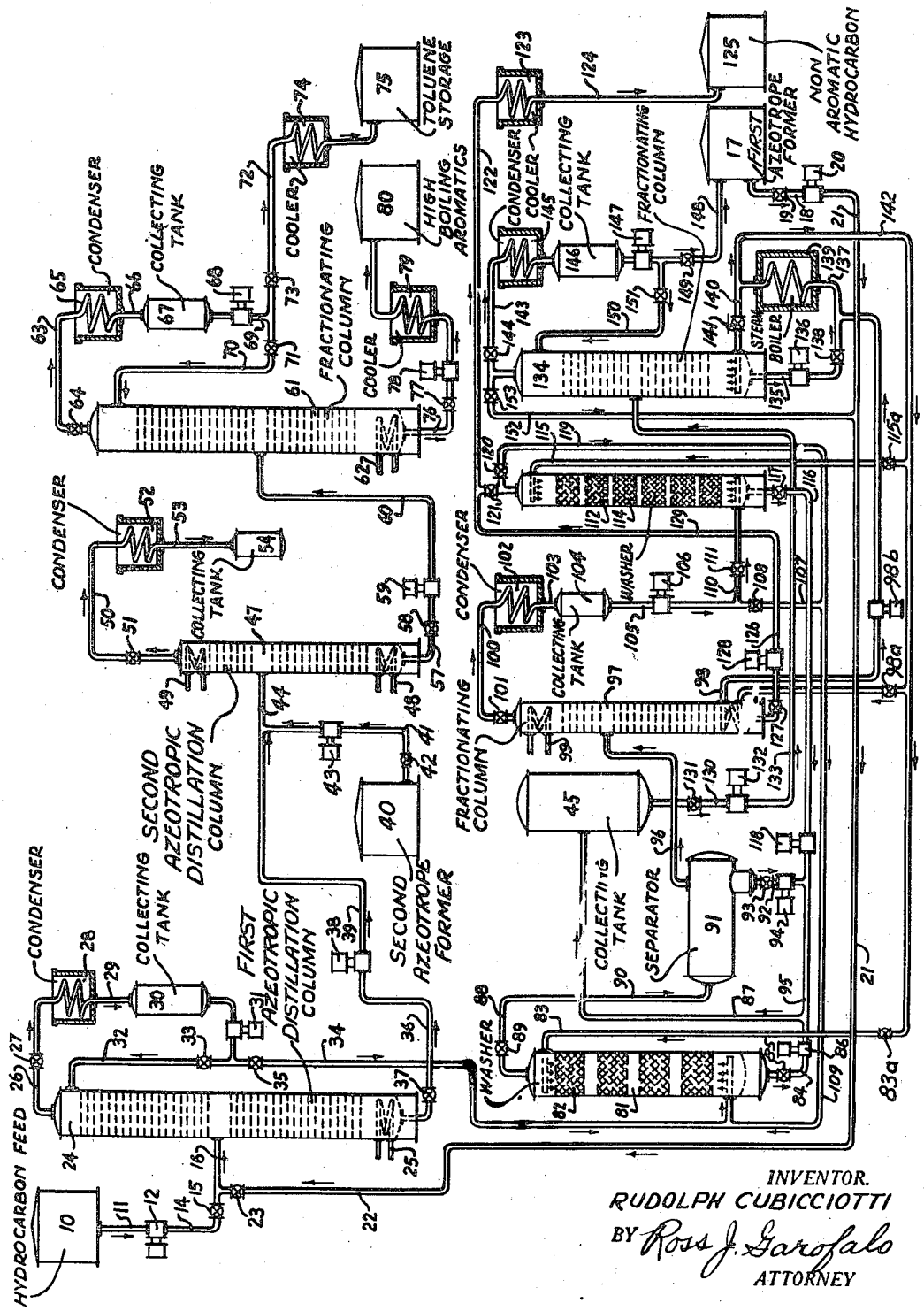

2,483,625

UNITED STATES PATENT OFFICE 2,483,625

TWO-STAGE AZEOTROPIC DISTILLATION OF NONAROMATIC HYDROCARBONS FROM TOLUENE

Rudolph Cubicciotti, Beverly Hills, Calif., assignor to Union Oil Company of California, Los Angeles, Calif., a corporation of California Application January 4, 1943, Serial No. 471,267

3 Claims. (Cl. 202—42)

This invention relates to a process of azeotropic distillation to prepare pure hydrocarbons from complex petroleum fractions which are difficult to separate by ordinary fractional distillation due to the small differences in boiling points of the hydrocarbons contained in the petroleum fraction. The invention is particularly directed to an improved process for separating the hydrocarbons and the azeotrope former that are contained in the azeotropic distillate produced by the azeotropic distillation.

The process of separating one hydrocarbon component from another hydrocarbon component of substantially the same boiling point contained in a complex hydrocarbon fraction by azeotropic distillation is well known. This process consists in distilling the hydrocarbon fraction in the presence of an extraneous substance which has a preferential affinity for one of the components contained in the complex hydrocarbon fraction, thus causing a disturbance of the vapor pressure equilibrium that formerly existed in the fraction in such manner that the partial vapor pressure or fugacity of at least one component in the fraction is changed sufficiently to permit its separation by controlled fractional distillation. In such processes, the distillation effects the separation of the relatively more paraffinic hydrocarbons together with the extraneous substance leaving as undistilled bottoms the relatively less paraffinic hydrocarbons which may or may not contain a portion of the extraneous substance. In the present description of my invention the aforesaid type of fractional distillation will be referred to as azeotropic distillation, the extraneous substance or substances which are added to the complex hydrocarbon fraction to effect the aforementioned change will be referred to as azeotrope formers and the overhead from the azeotropic distillation will be referred to as the azeotropic distillate.

One of the main difficulties in the azeotropic distillation process is in the separation or recovery of the azeotrope former from the hydrocarbons contained in the azeotropic distillate. One of the methods proposed for this purpose resides in washing the azeotropic distillate with water which is adapted to dissolve the azeotrope former from the azeotropic distillate and thus be separated from the hydrocarbons by settling and stratification. The solution of azeotrope former and water may be distilled to separate the azeotrope former from the water.

However, difficulty has been experienced in separating the azeotrope former substantially completely from the azeotropic distillate by washing with water since in many cases, the azeotrope former has a preferential solubility in the hydrocarbons as compared with the solubility in the water. The result is that the hydrocarbons must be washed with an excessively large amount of water in order to remove the last traces of the azeotrope former so that the hydrocarbons may be utilized and the azeotrope former recovered without sustaining a substantial loss of this more valuable material. To illustrate, it has been found that methyl ethyl ketone containing water, i. e. about 10% by volume, is very efficient as an azeotrope former to effect the separation of non-aromatic hydrocarbons from a hydrocarbon fraction containing toluene. Yet the use of this azeotrope former offers serious difficulty in recovering the methyl ethyl ketone from the azeotropic distillate. While the separation of the methyl ethyl ketone may be accomplished by washing with water, this has required about five or six volumes of water for each volume of azeotropic distillate.

Also, some of the very efficient azeotrope formers such as methyl ethyl ketone, acetone and the like require a relatively high ratio of the azeotrope former to non-aromatic hydrocarbons contained in the feed stock to effect the azeotropic distillation of the non-aromatic hydrocarbons from the feed stock. For example, when using methyl ethyl ketone as the azeotrope former, it will require about three volumes of this azeotrope former to distill one volume of the non-aromatic hydrocarbons contained in the feed stock. Hence, the amount of water required to extract the azeotrope former from the azeotropic distillate will be increeased in proportions to the amount of azeotrope former contained therein.

On the other hand, other azeotrope formers are not quite as efficient to separate the non-aromatic hydrocarbons from the aromatic hydrocarbons by azeotropic distillation; yet these require only relatively low ratios of azeotrope former to non-aromatic hydrocarbons contained in the feed stock to effect the azeotropic distillation of the non-aromatic hydrocarbons from the feed stock. For example, when using methyl alcohol as the azeotrope former, it will require only 1½ volumes of methyl alcohol to distill one volume of the non-aromatic hydrocarobns contained in the feed stock. Hence, the amount of water required to extract the methyl alcohol from the azeotropic distillate will be comparatively smaller. However, the separation of the non-aromatic from the aromatic hydrocarbons using methyl alcohol is not sharp as in the case of methyl ethyl ketone. The first products distilled over will generally be free from aromatic hydrocarbons but as the distillation continues beyond the 30 to 80% point of the non-aromatic hydrocarbons contained in the feed stock, depending upon the azeotrope former, aromatic hydrocarbons begin to distill over together with the non-aromatic hydrocarbons and azeotrope formers which increases as the distillation proceeds, so that it is necessary to lose considerable amounts of the aromatic hydrocarbons in the overhead in order to remove substantially all of the non-aromatic hydrocarbons from the aromatic hydrocarbons.

It is the purpose of this invention to provide a simple and efficient process to remove by azeotropic distillation substantially all of the non-aromatic hydrocarbons from the aromatic hydrocarbons without losing substantial amounts of the aromatic hydrocarbons in the overhead azeotropic distillate and wherein the amount of water used in the process required to recover the azeotrope former from the azeotropic distillate is considerably reduced.

Briefly stated, I have discovered that great economies in the quantity of water used to extract the azeotrope former from azeotropic distillate without sacrificing the yield of aromatic hydrocarbons which may be recovered from hydrocarbon stocks may be obtained by carrying out the azeotropic distillation in a plurality of stages employing different azeotrope formers for each stage. The azeotropic distillation in the first stage is effected in the presence of an azeotrope former which in itself is incapable of separating a high yield of aromatic hydrocarbons but which forms an azeotrope with the non-aromatic hydrocarbons in which the ratio of azeotrope former to the non-aromatic hydrocarbons contained in the azeotrope is relatively low. The azeotropic distillation in the second stage is effected in the presence of an azeotrope former which is efficient to effect a sharp separation between aromatic and non-aromatic hydrocarbons but which forms an azeotrope with the non-aromatic hydrocarbons in which the ratio of azeotrope former to the non-aromatic hydrocarbons is relatively high.

The azeotropic distillation in the first stage is carried out under such conditions using only a sufficient amount of the desired azeotrope former as to distill only a portion of the non-aromatic hydrocarbons contained in the feed stock without effecting distillation of substantial amounts of the aromatic hydrocarbons. In other words, the quantity of azeotrope former used in the first distillation stage is adjusted to form an azeotrope with only a portion of the non-aromatic hydrocarbons contained in the feed stock and which upon distillation is completely distilled from the stock together with the portion of non-aromatic hydrocarbons with which it forms an azeotrope or azeotropes. The amount of azeotrope former used is also adjusted preferably on an ideal point so that the azeotropic distillation will be substantially free from aromatic hydrocarbons. Thus, the distillation bottoms of the first stage azeotropic distillation will contain substantially all of the aromatic hydrocarbons contained in the feed stock, substantially no azeotrope former and a smaller amount of the non-aromatic hydrocarbons originally contained in the feed stock.

The azeotropic distillation in the second stage is carried out under such conditions also using preferably only a sufficient amount of the desired azeotrope former so as to distill the remaining portion of the non-aromatic hydrocarbons contained in the feed stock without distilling substantial amounts of aromatic hydrocarbons. Thus, the distillation bottoms obtained in the distillation stage will contain substantially all of the aromatic hydrocarbons contained in the feed stock, substantially no azeotrope former and substantially no non-aromatic hydrocarbons.

By effecting the azeotropic distillation in two stages employing an azeotrope former in the first stage which forms an azeotrope with the non-aromatic hydrocarbons having a low ratio of azeotrope former to non-aromatic hydrocarbons to remove a portion of the non-aromatic hydrocarbons and by employing an azeotrope former in the second stage which forms an azeotrope with the non-aromatic hydrocarbons having a higher ratio of azeotrope former to non-aromatic hydrocarbons but which is efficient to effect sharp separation as between the non-aromatic and aromatic hydrocarbons, I am able to reduce not only the total quantity of azeotrope former used to effect the desired sharp separation of non-aromatic from aromatic hydrocarbons contained in the feed stock but also the total quantity of water necessary to extract the azeotrope formers from the azeotropic distillates produced in the two stages. This, of course, represents savings in size of equipment used in both the azeotropic distillation stages and the azeotrope former recovery stages and also in heat load to conduct the azeotropic distillation and the recovery of the azeotrope former from the water used to extract the azeotrope former from the azeotropic distillate.

To illustrate further, assume a treatment on a hydrocarbon stock having a boiling range of 200–240° F. and consisting of approximately 50 parts of non-aromatic hydrocarbons and 50 parts of toluene. Methyl alcohol will form azeotropes with the non-aromatic hydrocarbons contained therein in the ratio of 1½ parts of methyl alcohol per part of non-aromatic hydrocarbons. Methyl alcohol, however, will remove only about 30 parts of the non-aromatic hydrocarbons as an azeotrope substantially free from toluene. Further distillation of non-aromatic hydrocarbons together with methyl alcohol will result in distilling overhead an azeotrope of methyl alcohol and toluene. Hence, if the azeotropic distillation is controlled using only sufficient methyl alcohol to distill only the 30 parts of non-aromatic hydrocarbons, approximately 45 parts of methyl alcohol will be required. The distillation residue will be substantially free from methyl alcohol and will consist of the remaining 20 parts of non-aromatic hydrocarbons and 50 parts of toluene.

Methyl ethyl ketone on the other hand forms azeotropes with the non-aromatic hydrocarbons in the ratio of 3 parts of methyl ethyl ketone per part of non-aromatic hydrocarbons. However, methyl ethyl ketone does not form an azeotrope with toluene and hence, substantially all of the non-aromatic hydrocarbons may be distilled from the toluene without distilling toluene overhead. If the distillation residue is then azeotropically distilled in the presence of 60 parts of methyl ethyl ketone, the 20 parts of non-aromatic hydrocarbons will distill overhead together with the 60 parts of methyl ethyl ketone, leaving the 50 parts of aromatic hydrocarbons as a distillation residue. Thus, a total of approximately 105 parts of both azeotrope formers were used to separate substantially all of the non-aromatic hydrocarbons and to recover substantially all of the toluene contained in the stock. In order to accomplish the same result in one stage using methyl ethyl ketone, it would be necessary to use about 150 parts of the methyl ethyl ketone.

A further savings is obtained in the recovery of the methyl alcohol and methyl ethyl ketone from the azeotropic distillates. In order to extract the 45 parts of methyl alcohol from its azeotrope with non-aromatic hydrocarbons, an equal volume of about 45 parts of water are necessary. To recover the 60 parts of methyl ethyl ketone from its azeotrope with non-aromatic hydrocarbons, about 5 volumes or about 300 parts of water are required. Hence, the total amount of water required to recover both azeotrope formers is 345 parts of water. Had the azeotropic distillation been carried out using methyl ethyl ketone in one stage, about 750 parts of water would have been required.

It is thus an object of my invention to provide a two-stage azeotropic distillation process wherein the azeotropic distillation is carried out in the first stage in the presence of an azeotrope former which forms azeotropes with non-aromatic hydrocarbons having a relatively low ratio of azeotrope former to non-aromatic hydrocarbons and wherein the azeotropic distillation is carried out in the second stage in the presence of an azeotrope former which forms azeotropes with non-aromatic hydrocarbons having a relatively high ratio of azeotrope former to non-aromatic hydrocarbons. A further object is to control the distillation in the first stage in the presence of only sufficient azeotrope former as to distill the maximum amount of non-aromatic hydrocarbons as may be distilled without distilling substantial amounts of aromatic hydrocarbons.

Other objects, features and advantages of my invention will be apparent to those skilled in the art from the following description of the invention which represents a diagrammatic arrangement of apparatus for carrying out my invention. In the following example, the invention will be described as applied to the separation of toluene from a hydrocarbon fraction employing methyl alcohol as the azeotrope former in the first azeotropic distillation stage and methyl ethyl ketone containing about 10% by volume of water as the azeotrope former in the second azeotropic distillation stage. However, it will be observed that this example is not to be taken as limiting my invention since the process is applicable to separate other components from complex substances employing other azeotrope formers in the various stages.

In the drawing, 1000 parts by volume of a hydrocarbon fraction obtained by fractionation of a catalytically reformed gasoline, said fractions having a boiling range of about 200 to 240° F. and consisting of approximately 450 parts by volume of toluene, 60 parts by volume of olefins, 245 parts by volume of paraffins and 245 parts by volume of naphthene hydrocarbons, is taken from tank 10 via line 11 and is pumped by pump 12 through line 14 controlled by valve 15 into line 16. 600 parts by volume of methyl alcohol is taken from tank 17 via line 18 controlled by valve 19 and is pumped by pump 20 through lines 21 and 22 and valve 23 into line 16 where it is mixed with the hydrocarbon feed from tank 10. The mixture of hydrocarbon feed and azeotrope former is passed into the first azeotropic distillation column 24 where the mixture is subjected to distillation and fractionation, heat being supplied by closed steam coil 25. In column 24, the distillation is controlled so as to distill overhead an azeotrope consisting of substantially all of the methyl alcohol, i. e. 600 parts, 200 parts of paraffins, 20 parts of olefins and 180 parts of naphthene hydrocarbons substantially free from aromatic hydrocarbons. The amount of methyl alcohol used was controlled so that only the non-aromatic hydrocarbons distilled overhead without distilling any of the aromatic hydrocarbons, while leaving some of the non-aromatic hydrocarbons in the distillation bottoms. Distillation is accomplished at an overhead temperature of approximately 140° F. and at atmospheric pressure. The above overhead azeotrope is removed from the distillation column via line 26, controlled by valve 27, condensed in condenser 28 and passed via line 29 into collecting tank 30. The condensate consisting of the methyl alcohol and non-aromatic hydrocarbons is withdrawn from the bottom of the collecting tank 30 by pump 31 and part thereof may be passed via line 32 controlled by valve 33 to the distillation column 24 to serve as reflux for the fractionation. The remaining portion of the condensate is passed via line 34 and valve 35 to a methyl alcohol recovery system as will be described hereinafter.

The bottoms in the first fractionating column 24 consisting of 450 parts by volume of toluene, 45 parts by volume of paraffins, 40 parts by volume of olefins and 65 parts by volume of naphthenes are withdrawn via line 36 controlled by valve 37 and are pumped by pump 38 into line 39 where it is mixed with a second azeotrope former taken from tank 40 via line 41 controlled by valve 42 and pump 43. In this case, the second azeotrope former will be one which is efficient to remove substantially all of the remaining non-aromatic hydrocarbons from the aromatic hydrocarbons, even though this may require a greater ratio of azeotrope formers to non-aromatic hydrocarbons contained in the mixture than are used in the first azeotropic distillation stage. In the example herein given, approximately 450 parts by volume of methyl ethyl ketone containing about 10% water were mixed with the 600 parts of the bottoms withdrawn from column 24. The mixture of the second azeotrope former and bottoms is passed via line 44 into the second azeotropic distillation column 47 provided with a heater 48 and reflux cooling coil 49 where the mixture is subjected to distillation and fractionation. Distillation column 47 may be operated in a manner similar to that described for column 24. In column 47, the distillation is controlled so as to distill overhead an azeotrope consisting of all of the methyl ethyl ketone, water and paraffins, olefins and naphthenes substantially free from aromatic hydrocarbons. Distillation is accomplished at an overhead temperature of approximately 165° F. and at atmospheric pressure. The above overhead azeotrope is removed from the distillation column 47 via line 50 controlled by valve 51, condensed in condenser 52 and passed via line 53 into collecting tank 54. This condensate may likewise be passed to a methyl ethyl ketone recovery system as will be described hereinafter.

The aromatic hydrocarbons are withdrawn from the column 47 and may be passed via line 57 controlled by valve 58 and pump 59 into fractionating column 61 where the mixture is fractionated to remove the toluene as an overhead product aided by heat from the heater 62. The vaporized toluene is removed from the top of the fractionating column 61 via line 63 controlled by valve 64, condensed in condenser 65 and passed via line 66 into collecting tank 67. The condensate may be withdrawn from the collecting tank by pump 68 and passed into line 69. Part of the condensate may be cycled via line 70 controlled by valve 71 to the fractionating column 61 to serve as reflux for the fractionation. The remaining portion is passed via line 72 controlled by valve 73 through cooler 74 into storage tank 75. The bottoms from the fractionating column 61 consisting of xylene or a mixture of xylene and higher boiling aromatic hydrocarbons, are withdrawn via line 76 controlled by valve 77 and pumped by pump 78 through cooler 79 into storage tank 80.

The toluene obtained in tank 75 and the higher boiling aromatic hydrocarbons obtained in tank 80 may be treated with clay which may be accomplished at a temperature of 230° F. employing 1 to 5 pounds of clay per barrel of the hydrocarbon fraction. If desired, the clay treatment may precede the fractionation in fractionating column 61 in which case the fractionation in 61 serves to rerun the clay treated stock and to fractionate the high boiling aromatic hydrocarbons from the toluene. In place of clay treatment, the aromatic fraction may be cooled and then treated with 1 to 10 pounds of sulfuric acid per barrel of the hydrocarbons followed by neutralization with clay or caustic alkali. The acid treatment serves to remove small traces of undesirable unsaturated hydrocarbons which may be detrimental in color stability and nitration of the toluene.

In the event the toluene obtained at the bottom of distillation column 47 is relatively free from higher boiling aromatic hydrocarbons, it may be passed directly to storage or clay or acid treated, rerun and passed to storage. This will be particularly true if the original stock to the azeotropic distillation has been carefully fractionated to remove all aromatic hydrocarbons boiling above 240° F. as was the case in the example herein given.

The 1000 parts by volume of the mixture of methyl alcohol and non-aromatic hydrocarbons passed into line 34 are passed into the bottom of a washer 81 which is provided with packing material, such as broken tile 82, where the mixture is countercurrently washed with water introduced into the top of the washer via line 83. The washing procedure dissolves the methyl alcohol from the non-aromatic hydrocarbons. The solution of water and methyl alcohol is withdrawn via line 84 controlled by valve 85 and is pumped by pump 86 through line 87 into collecting tank 45.

The non-aromatic hydrocarbons are withdrawn from the top of the washer 81 via line 88 controlled by valve 89 and are passed via line 90 into a separator 91 where any water and methyl alcohol which did not settle from the hydrocarbons in washer 81 separates and is passed via line 92 controlled by valve 93 and pump 94 through lines 95 and 87 to collecting tank 45. The non-aromatic hydrocarbons are removed from the separator via line 96 and passed into fractionating column 97 provided with heater 98 and reflux coil 99 where they are subjected to fractionation to remove remaining traces of methyl alcohol and also a portion of the non-aromatic hydrocarbons. These pass via line 100 controlled by valve 101, condensed in condenser 102 and pass via line 103 into collecting tank 104. This mixture is withdrawn via line 105 and is pumped by pump 106 either into line 107 controlled by valve 108 and line 109 into washer 81 where the mixture is subjected to re-washing together with the mixture passed through line 34 or the mixture may be passed via line 110 controlled by valve 111 into the bottom of a second washer 112 which is provided with checkerwork of broken tile 114 where the mixture is countercurrently washed with water introduced into the top of the washer via line 115. The aqueous methyl alcohol is withdrawn at the bottom of the washer via line 116 controlled by valve 117 and is returned by pump 118 and lines 95 and 87 to collecting tank 45. The non-aromatic hydrocarbons withdrawn at the top of the washer 112 may be recycled via line 119 controlled by valve 120 and line 109 to the washer 81 where the hydrocarbons may be further washed together with the mixture passing through line 34. However, these hydrocarbons may be passed through valve 121, line 122, cooler 123 and line 124 to non-aromatic hydrocarbon storage tank 125. The non-aromatic hydrocarbons obtained at the bottom of the fractionating column 97 may likewise be passed to storage tank 125 via line 126 controlled by valve 127, pump 128 and lines 129 and 122, cooler 123 and line 124.

In order to remove the 600 parts by volume of methyl alcohol contained in the azeotropic distillate of the first azeotropic distillation stage, approximately 600 parts by volume of water were employed at a temperature of about 75° F. Most of the water, i. e., 550 parts was used in the first stage of washing while only a relatively small amount, i. e. 50 parts was used in the second stage. If desired, particularly in recovery of methyl alcohol, the total amount of water, i. e. 600 parts would be sufficient to extract substantially all of the methyl alcohol in one stage, thereby eliminating the necessity of the fractionation in column 97 and washing in washer 112.

The aqueous methyl alcohol in collecting tank 45 is passed via line 130, controlled by valve 131 and is pumped by pump 132 through line 133 into fractionating column 134 where the distillation is controlled to separate substantially all of the methyl alcohol as an overhead free from water. The distillation is aided by steam produced by passing water from the bottom of the fractionating column via line 135, pump 136, line 137 controlled by valve 138 through steam boiler 139 from which the hot water is passed via line 140 through pressure reduction valve 141 and the steam is passed into the bottom of the fractionating column 134. The remaining portion of the hot water is passed under pressure into line 142 from which it passes into line 115 controlled by valve 115a and line 83 controlled by valve 83a to serve as the water for washing the hydrocarbons in washers 112 and 81, respectively. A portion is also passed through valve 98a to pass through the heating coil positioned at the bottom of column 99 from which it is returned by pump 98b to line 137. Thus the water used in the recovery system is maintained in a closed system and any methyl alcohol contained therein which has not been vaporized in column 134 is likewise maintained in the closed system. This eliminates the necessity for recovering all of the methyl alcohol from the water used to wash the mixture of non-aromatic hydrocarbons and methyl alcohol.

The azeotrope former distilled in the fractionating column 134 is withdrawn via line 143 controlled by valve 144 condensed in condenser 145 and passed into collecting tank 146 from which it may be passed by pump 147 through line 148 controlled by valve 149 into storage tank 17. Part of the condensate may be passed via line 150 controlled by valve 151 to fractionating column 134 to serve as reflux for the fractionation. Preferably, the vaporized azeotrope former removed at the top of the fractionating column 134 is passed via line 152 controlled by valve 153 through lines 21 and 22, and valve 23 into line 16 to serve as azeotrope former for the distillation in fractionating column 24.

The foregoing recovery system has been described in connection with the recovery of the azeotrope former used in the first azeotrope distillation. The azeotrope former used in the second azeotropic distillation may likewise be recovered from the azeotropic distillate collected in tank 54. Since the recovery of methyl ethyl ketone presents greater difficulties, it is preferable to subject the azeotropic distillate to washing in washer 81, distillation in column 97 and further washing in washer 112 as described above. The distillation of the aqueous methyl ketone in column 134 produced an azeotrope of methyl ketone containing 10% water. To recover the 450 parts of methyl ethyl ketone and water contained in the second azeotropic distillate, a total of approximately 2250 parts by volume were required. Thus, the total quantity of water required to recover both the methyl alcohol and methyl ethyl ketone was about 2850 parts by volume. It will be observed that if the azeotropic distillation had been carried out in one stage using methyl ethyl ketone containing 10% water, it would have required about 1650 parts by volume of this azeotrope former which would have resulted in producing an azeotropic distillate containing 550 parts by volume of non-aromatic hydrocarbons and 1650 parts by volume of azeotrope former. In order to recover the azeotrope former from the azeotropic distillate, about 8250 parts by volume of water would have been required.

While the foregoing azeotrope former recovery system has been described as consisting essentially of a primary washing of the azeotropic distillate to remove a considerable portion of the azeotrope former followed by the distillation of the washed hydrocarbons to concentrate the remaining azeotrope former in a relatively small amount of the hydrocarbons and followed by a second washing of this mixture to remove the remaining portion of the azeotrope former, it is obvious that if the hydrocarbons obtained in the second washing operation still contain a substantial amount of azeotrope former, these may be again distilled to concentrate the remaining azeotrope former in a still small portion of hydrocarbons and this mixture may again be washed. In other words, the process may be carried out by employing a plurality of washing steps interposed with intermediate distillation steps in order to concentrate the unwashed azeotrope former in a relatively small amount of hydrocarbons. In this manner, the azeotrope former is effectively removed from the azeotropic distillate without loss of azeotrope former with employment of a relatively small amount of water.

Besides methyl alcohol and methyl ethyl ketone disclosed above, water soluble azeotrope formers which may be recovered from azeotropic distillates in accordance with my invention include fatty acids such as acetic, formic, propionic and isobutyric acids, other aliphatic alcohols such as ethyl, isopropyl, normal propyl and tertiary butyl alcohols, polyhydric alcohols such as mono-, di-, tri-, tetra- and hexa-ethylene glycols and dipropylene glycol, other ketones such as acetone, amines such as mono-, di- and tri-ethanolamine, 2-methyl-2-amino-1-propanol, ethylene diamine, phenolic compounds such as phenol, xylenols, resorcinol and catechol and alkyl ethers of polyglycols such as mono-ethyl ether of ethylene and diethylene glycols.

In some cases, particularly when an azeotrope former is used which is water insoluble and hence cannot be separated by water washing, the separation of the azeotrope former may be accomplished by extraction with a solvent which is adapted to selectively dissolve the azeotrope former and substantially none of the hydrocarbons at the temperature of extraction. Water insoluble azeotrope formers which may be extracted in this manner include such phenolic compounds as cresylic acid, fatty acids such as caproic, heptylic, caprylic and nonylic acids, amines such as aniline, toluidine, xylidine, orthophenylene diamine and alpha naphthol amine, higher aliphatic alcohols such as amyl, hexyl and heptyl alcohols, cyclic compounds such as cyclohexanone, cyclohexanol, furfural, nitrobenzene and benzyl alcohols, nitroparaffins such as nitromethane, nitroethane and the nitropropanes. The extraction of the azeotrope former by means of the selective solvent may also be employed in the case of the water soluble azeotrope formers.

Selective solvents adapted to separate the azeotrope former from the non-aromatic hydrocarbons include many of the compounds disclosed above as azeotrope formers. Particularly suitable selective solvents include the polyhydric alcohols, the ethanolamines, diethylene triamine and nitromethane.

Any of the aforementioned azeotrope formers may be used as azeotrope formers in my process, it, however, being understood that in selecting the azeotrope formers to be used, one should choose for the first stage, an azeotrope former which forms an azeotrope in which the ratio of azeotrope former to non-aromatic hydrocarbons is lower than that formed in the second stage but in itself is inadequate to recover a high yield of the aromatic hydrocarbons from the particular stock, whereas that chosen for the second stage is capable of removing all of the non-aromatic hydrocarbons with a high yield of aromatic hydrocarbons. Preferably, that chosen for the second stage azeotropic distillation should not form an azeotrope with the aromatic hydrocarbons. Whether a particular agent is considered an efficient azeotrope former or not for the second stage will depend upon the particular stock to be treated. One material may be an efficient azeotrope former for a particular stock and may effect a sharp separation between non-aromatic and aromatic hydrocarbons and will not form an azeotrope with the aromatic hydrocarbons and yet this same material when used on another stock may form an azeotrope with the particular aromatic hydrocarbons contained therein and thus permit distillation of only a portion of the non-aromatic hydrocarbons as a fraction free from aromatic hydrocarbons. In the former, the material may form azeotropes having a higher ratio of azeotrope former to non-aromatic hydrocarbons whereas in the latter, the ratio may be lower. For example, methyl alcohol forms an azeotrope with toluene but not with xylene. Also a lower ratio of methyl alcohol to non-aromatic hydrocarbons is formed when distilling a toluene cut than when distilling a xylene cut. Hence, when treating a toluene cut, one may use methyl alcohol in the first stage and when treating a xylene cut, one may use it as a second stage azeotrope former. Instead of using azeotropic distillation to concentrate the aromatic hydrocarbons in the first stage, one may use extraction with a selective solvent which is then followed by azeotropic distillation. However, azeotropic distillation in both stages is preferred.

The foregoing description of my invention is not to be taken as limiting my invention but only as illustrative thereof since many variations may be made by those skilled in the art without departing from the scope of the following claims.

I claim:

1. A process for the treatment of a toluene fraction containing non-aromatic hydrocarbons which ordinarily distill from the toluene fraction in the same temperature range as the toluene distills therefrom which comprises distilling said toluene fraction in the presence of a sufficient amount of methyl alcohol to distill only a portion of said non-aromatic hydrocarbons together with said methyl alcohol without distilling a substantial amount of toluene, said methyl alcohol being adapted to remove by azeotropic distillation only a portion of said non-aromatic hydrocarbons without distilling toluene, thereby leaving the remaining portion of said non-aromatic hydrocarbons together with said toluene in the residue, distilling said residue in the presence of a sufficient amount of methyl ethyl ketone to distill the remaining portion of said non-aromatic hydrocarbons together with said methyl ethyl ketone without distilling substantial amounts of toluene, said methyl ethyl ketone being adapted to remove by azeotropic distillation substantially all of the non-aromatic hydrocarbons without distilling toluene from a mixture of toluene and non-aromatic hydrocarbons when used in sufficient amounts, thereby leaving said toluene in the residue substantially free from non-aromatic hydrocarbons, said methyl alcohol being adapted to form azeotropes with said non-aromatic hydrocarbons having a relatively low ratio of azeotrope former to non-aromatic hydrocarbons and said methyl ethyl ketone being adapted to form azeotropes with said non-aromatic hydrocarbons having a relatively high ratio of azeotrope former to non-aromatic hydrocarbons, said methyl alcohol being capable of forming azeotropes with the toluene contained in said toluene fraction and said methyl ethyl ketone being incapable of forming azeotropes with said toluene during said azeotropic distillation.

2. A process for the treatment of a toluene fraction containing non-aromatic hydrocarbons which ordinarily distill from the toluene fraction in the same temperature range as the toluene distills therefrom which comprises distilling said toluene fraction in the presence of a sufficient amount of a first azeotrope former to distill only a portion of said non-aromatic hydrocarbons together with said first azeotrope former thereby leaving the remaining portion of said non-aromatic hydrocarbons together with said toluene in the residue, distilling said residue in the presence of a sufficient amount of methyl ethyl ketone to distill substantially all of the remaining non-aromatic hydrocarbons together with said methyl ethyl ketone thereby leaving toluene in the residue substantially completely separated from non-aromatic hydrocarbons, said first azeotrope former being a material which forms azeotropes with non-aromatic hydrocarbons having a lower ratio of azeotrope former to non-aromatic hydrocarbons than the ratio of methyl ethyl ketone to non-aromatic hydrocarbons in azeotropes formed with methyl ethyl ketone and non-aromatic hydrocarbons and being more readily separable than methyl ethyl ketone from its azeotropes with said non-aromatic hydrocarbons by extraction with water.

3. A process for the treatment of a toluene fraction containing non-aromatic hydrocarbons which ordinarily distill from the toluene fraction in the same temperature range as the toluene distills therefrom which comprises distilling said toluene fraction in the presence of a sufficient amount of methyl alcohol to distill only a portion of said non-aromatic hydrocarbons together with said methyl alcohol without distilling a substantial amount of toluene thereby leaving the remaining portion of said non-aromatic hydrocarbons together with said toluene in the residue, distilling said residue in the presence of a sufficient amount of methyl ethyl ketone to distill the remaining portion of said non-aromatic hydrocarbons together with said methyl ethyl ketone without distilling substantial amounts of toluene thereby leaving said toluene in the residue substantially free from non-aromatic hydrocarbons.

RUDOLPH CUBICCIOTTI.

REFERENCES CITED

The following references are of record in the file of this patent:

UNITED STATES PATENTS

| Number | Name | Date |
|---|---|---|
| 1,668,380 | Ricard | May 1, 1928 |
| 2,265,220 | Sullivan | Dec. 9, 1941 |
| 2,350,256 | Shiras | May 30, 1944 |
| 2,356,240 | Hamlin | Aug. 22, 1944 |
| 2,360,655 | Deanesly | Oct. 17, 1944 |
| 2,376,870 | Engel | May 29, 1945 |
| 2,388,040 | Clark | Oct. 30, 1945 |

OTHER REFERENCES

Mizuta: Journal Society of Chemical Industry, Japan, volume 35 (1932), pages 1172–1177 (13 page translation in Division 25). Supplemental binding, page 420–B. Copy in Scientific Library. 202/42/H.

Rossini et al.: Proceedings, 21st annual meeting, American Petroleum Institute, section III, Refining, Nov. 11th to 15th, 1940, pages 43–47. Copy in Division 25. 202/42/L.